(12) United States Patent
Boyce

(10) Patent No.: US 7,395,576 B2
(45) Date of Patent: Jul. 8, 2008

(54) WIPER OPENING COVER

(75) Inventor: Dean Arden Boyce, Waterloo, IA (US)

(73) Assignee: Deere & Company, Moline, IL (US)

( * ) Notice: Subject to any disclaimer, the term of this patent is extended or adjusted under 35 U.S.C. 154(b) by 793 days.

(21) Appl. No.: 10/886,349

(22) Filed: Jul. 7, 2004

(65) Prior Publication Data

US 2006/0005340 A1    Jan. 12, 2006

(51) Int. Cl.
  *B60S 1/34*  (2006.01)
  *B60S 1/04*  (2006.01)
  *B60S 1/32*  (2006.01)

(52) U.S. Cl. .............................. 15/250.31; 15/250.351; 15/250.001; 15/250.16; 277/628; 277/634; 277/644; 277/921; 296/96.15

(58) Field of Classification Search ................ 15/250.3, 15/250.31, 250.001, 250.351, 250.19, 250.16; 277/628, 634, 644, 921, 237, 315; 74/18, 74/18.1, 18.2, 503; 296/96.15, 96.17
See application file for complete search history.

(56) References Cited

U.S. PATENT DOCUMENTS

| 1,197,868 | A | * | 9/1916 | Smith ....................... 15/250.31 |
| 3,042,954 | A | * | 7/1962 | Wynn et al. ............... 15/250.24 |
| 4,610,179 | A | * | 9/1986 | Parker ......................... 74/335 |
| 5,046,216 | A | * | 9/1991 | Baungarter et al. ...... 15/250.29 |
| 5,410,774 | A | * | 5/1995 | Adams ...................... 15/230.1 |

FOREIGN PATENT DOCUMENTS

| FR | 2734222 | * | 11/1996 |
| JP | 2-162139 | * | 6/1990 |
| JP | 10-167117 | * | 6/1998 |

* cited by examiner

*Primary Examiner*—Gary K Graham

(57) ABSTRACT

A wiper cover is mounted in an opening in a vehicle housing and receives a wiper arm which pivots within the opening. The cover has a hollow body mounted in the opening, a rear flap which projects upwardly and forwardly from a rear side of the body, and a front flap which projects upwardly and rearwardly from a front side of the body. The front flap extends above and overlaps a portion of the rear flap. The flaps substantially cover the opening and slidably engage the wiper arm as it pivots within the opening. The body has upper and lower flanges which form a groove therebetween which receives an edge of the housing. The flaps include a notch and a recess which receives the wiper arm when the wiper arm is in a park position.

16 Claims, 5 Drawing Sheets

WIPER OPENING COVER

BACKGROUND

The present invention relates to a flexible cover or boot for an opening which receives a pivoting windshield wiper.

Agricultural vehicles with cabs normally have a front windshield wiper pivotally mounted at a pivot point either in the roof or above the cowl/hood surface. For roof-mounted wipers, there is normally a hole in a horizontal surface of the roof. But, debris does not tend to pass through such a hole in a cab roof.

If the wiper pivot point is located below the cowl/hood surface, a large opening is required to accommodate the motion of the wiper arm. When the wiper is not in use, the arm is located to one side in a "park" position and a large portion of the opening will be uncovered. Debris can fall through this uncovered part of the opening and onto hot surfaces and vehicle control components located beneath the opening. The opening is large for the wiper arm motion and located in a highly visible area of the vehicle in the center of the cowl. If there is no cover over this opening, then hot air from under the hood will flow up the front windshield and place an additional heat load on the cab in the summer. An uncovered wiper hole in the cowl will not provide control for water, snow, dirt, or debris.

Such an opening cannot be covered by a conventional convoluted boot because such a boot will not permit the required range of wiper arm motion. The opening cannot be covered with a cover which moves in the opening with the wiper arm because accumulated dirt and ice can interfere with motion of the cover, and this could overload the wiper motor.

SUMMARY

Accordingly, an object of this invention is to provide a cover for a wiper arm opening which prevents debris and dirt from entering the opening without restricting the wiper arm operation.

This and other objects are achieved by the present invention, wherein a wiper cover is mounted in an opening in a vehicle housing and receives a wiper arm which pivots within the opening. The cover has a hollow body mounted in the opening, a rear flap which projects upwardly and forwardly from a rear side of the body, and a front flap which projects upwardly and rearwardly from a front side of the body. The front flap extends above and overlaps a portion of the rear flap. The flaps substantially cover the opening and slidably engage the wiper arm as it pivots within the opening. The body has upper and lower flanges which form a groove therebetween which receives an edge of the housing. The flaps include a notch and a recess which receives the wiper arm when the wiper arm is in a park position.

The wiper cover closes over the opening and allows the required wiper arm motion. The overlapping flexible hinged flaps reduce the opening for dirt, water, snow, and debris to pass through as the wiper arm moves or is in the park position. The cover has an aesthetically pleasing design. The angled surfaces of the cover help the flaps to flex in response to motion of the wiper arm. The flanges help retain the cover in the cowl opening as the wiper arm sweeps through its range of motion. A convoluted boot could not meet these requirements.

DETAILED DESCRIPTION

Figure 1:
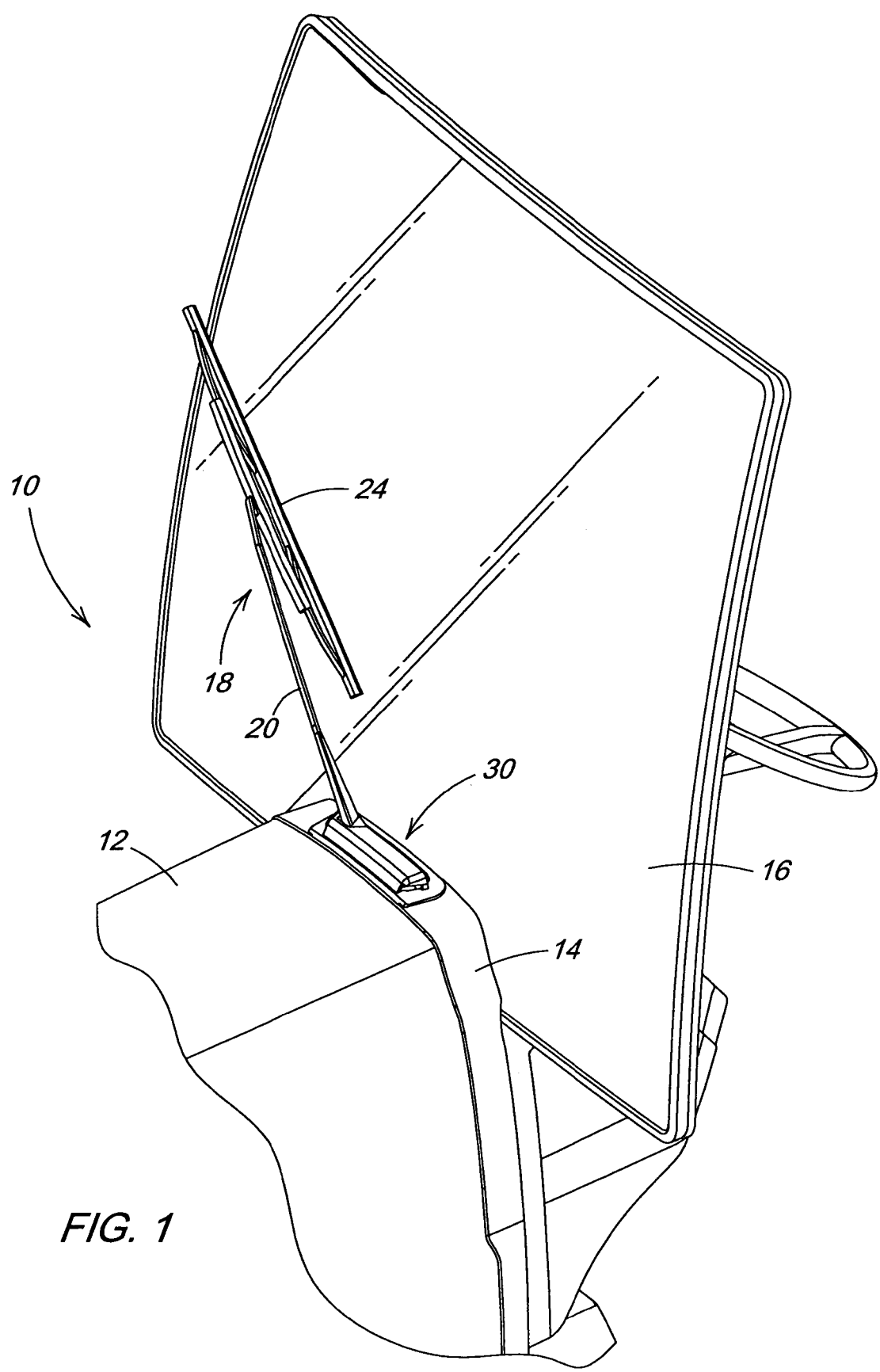
FIG. 1 is a perspective view of a portion of a tractor including a hood, a cowl, a windshield, a wiper and a wiper opening cover according to the present invention.
Figure 2:
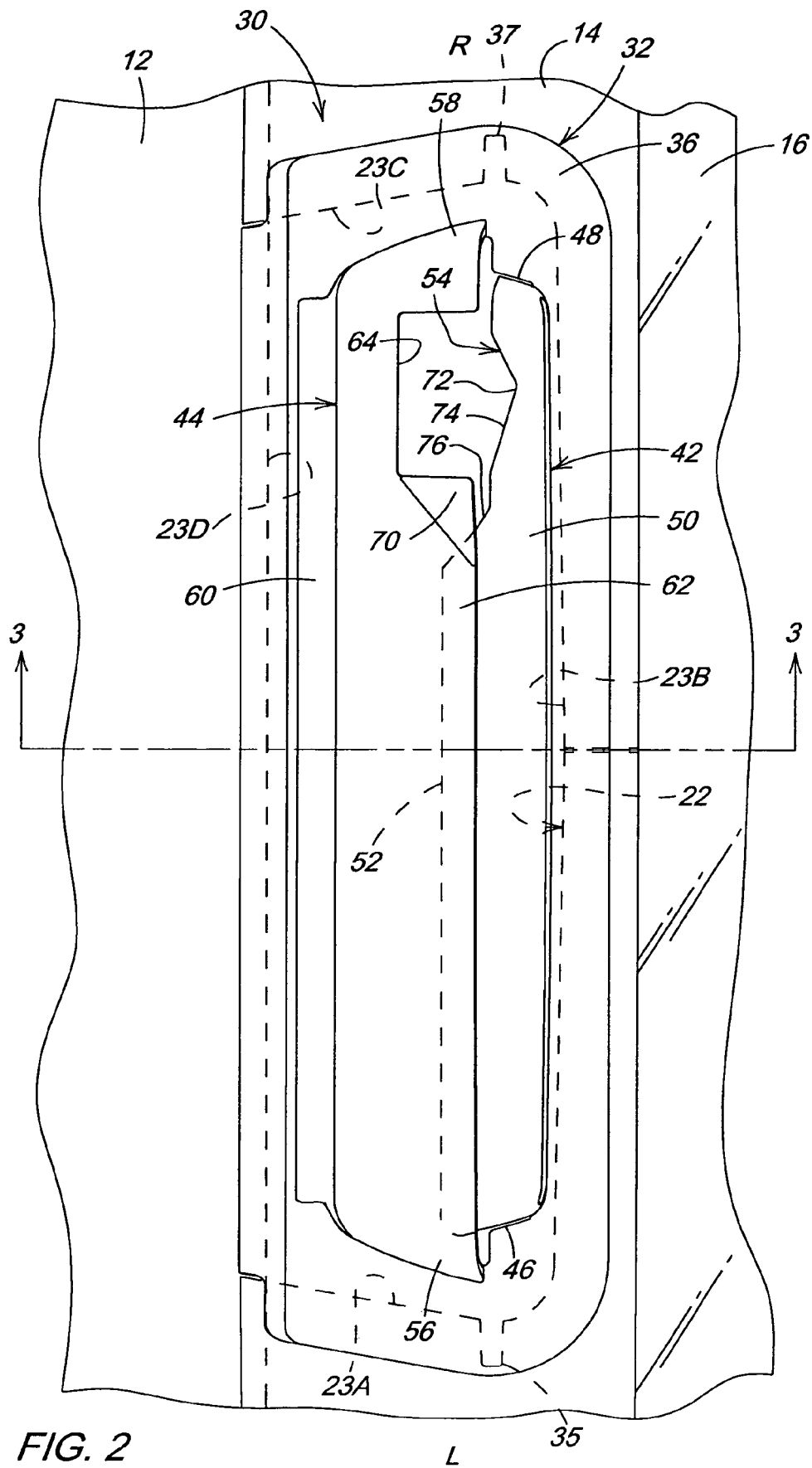
FIG. 2 is top view of the cover of FIG. 1.

Referring to FIGS. 1 and 2, we see a portion of a tractor 10 including a hood 12, cowl 14, and windshield 16 and windshield wiper 18. The wiper 18 has a wiper arm 20 which is mounted in a conventional manner on a shaft (not shown) of a conventional wiper motor (not shown) which is mounted below the hood 12 and cowl 14. An opening 22 is formed in the cowl 14 so that the arm 20 can pivot back and forth as wiper blade 24 sweeps the windshield 16. As best seen in FIG. 2, three sides 23A, 23B, 23C of the opening 22 are formed by the cowl 14 and the fourth side 23D is formed by an edge of the hood 12. According to the present invention, an improved boot or cover 30 is mounted in this opening. Cover 30 is preferably formed out of flexible rubber material.

Referring now to FIGS. 2-6, cover 30 has an elongated hollow base or body 32 with a lower lip or flange 34 and an upper lip or flange 36 separated by slot 38. Left and right ribs 35 and 37 extend between lips 36 and 38 and are received by corresponding slots in the cowl 14. Slot 38 receives the side edges and the rear edge portions of the cowl 14 which define opening 22. The body 32 surrounds an elongated cover opening 40. A smaller rear flap 42 projects from the rear edge of opening 40. A larger front flap 44 projects from the front edge of opening 40. The lower lip 34 engages the bottom surface of cowl 14 and the upper lip 36 engages an upper surface of cowl 14. The ribs 35 and 37 help prevent the lips 34, 36 from flexing as the wiper arm 20 is in motion. The ribs 35, 37 also help prevent the cover 30 from being dislodged from the cowl 14 due to wiper motion, and positively locate and retain the cover 30 to the cowl 14 in the for-aft direction.

Figure 3:
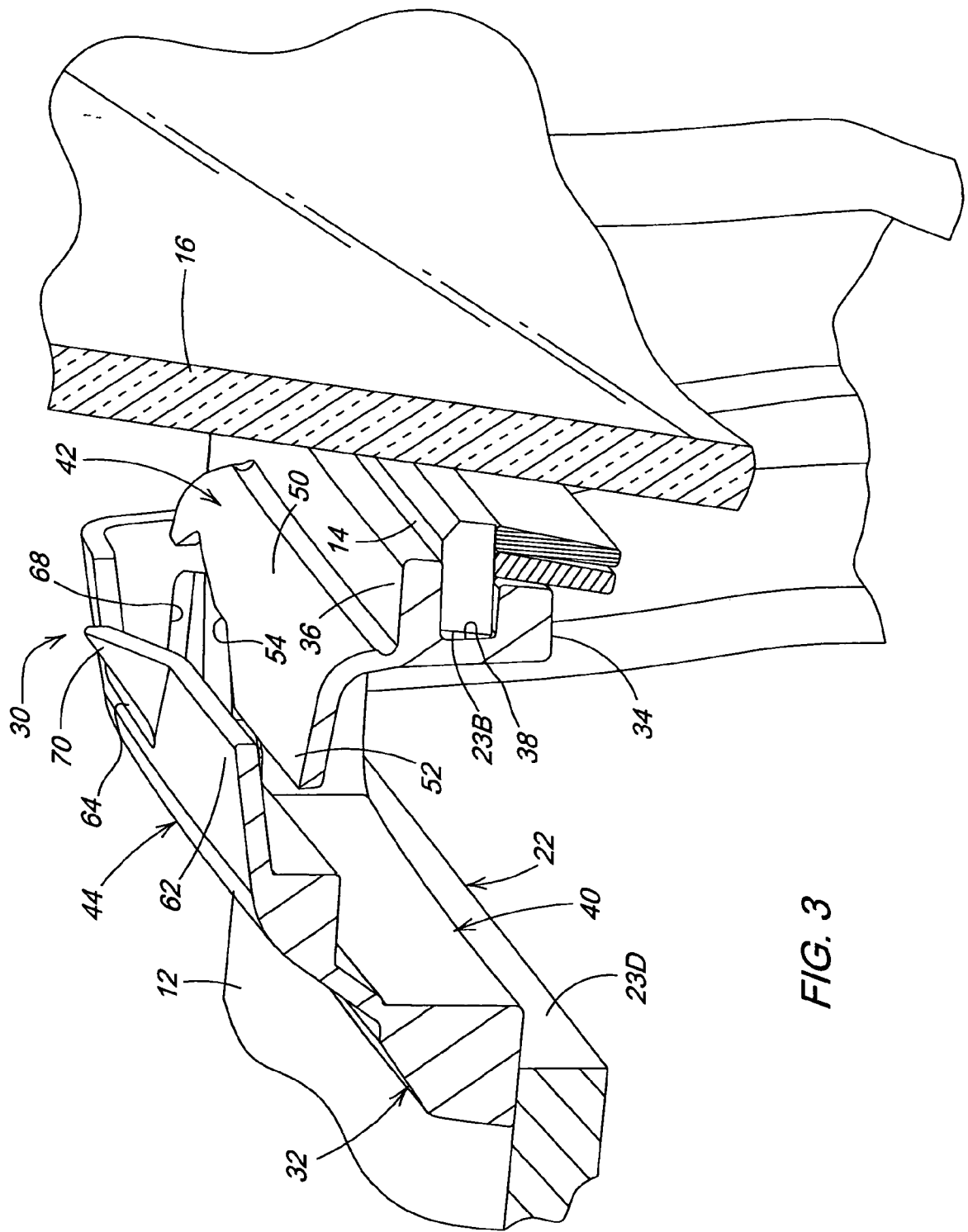
FIG. 3 is a perspective sectional view 2 taken along lines 3-3 of FIG. 2.

Rear flap 42 has left and right side walls 46, 48 and rear wall 50 which extend generally upwardly from the base 32 and which curve and merge smoothly into a lip 52 which projects up and towards the front. A recess 54 is formed in the right end of lip 52. Recess 54 has a generally triangular shape with an inner corner 72 and edges 74 and 76 which extend between corner 72 and the forward edge of lip 52. Edges 74 and 76 extend at acute angles with respect to the laterally extending front edge of lip 52. As best seen in FIG. 3, wall 50 is thinner where it joins lip 36 for increased flexibility.

Figure 4:
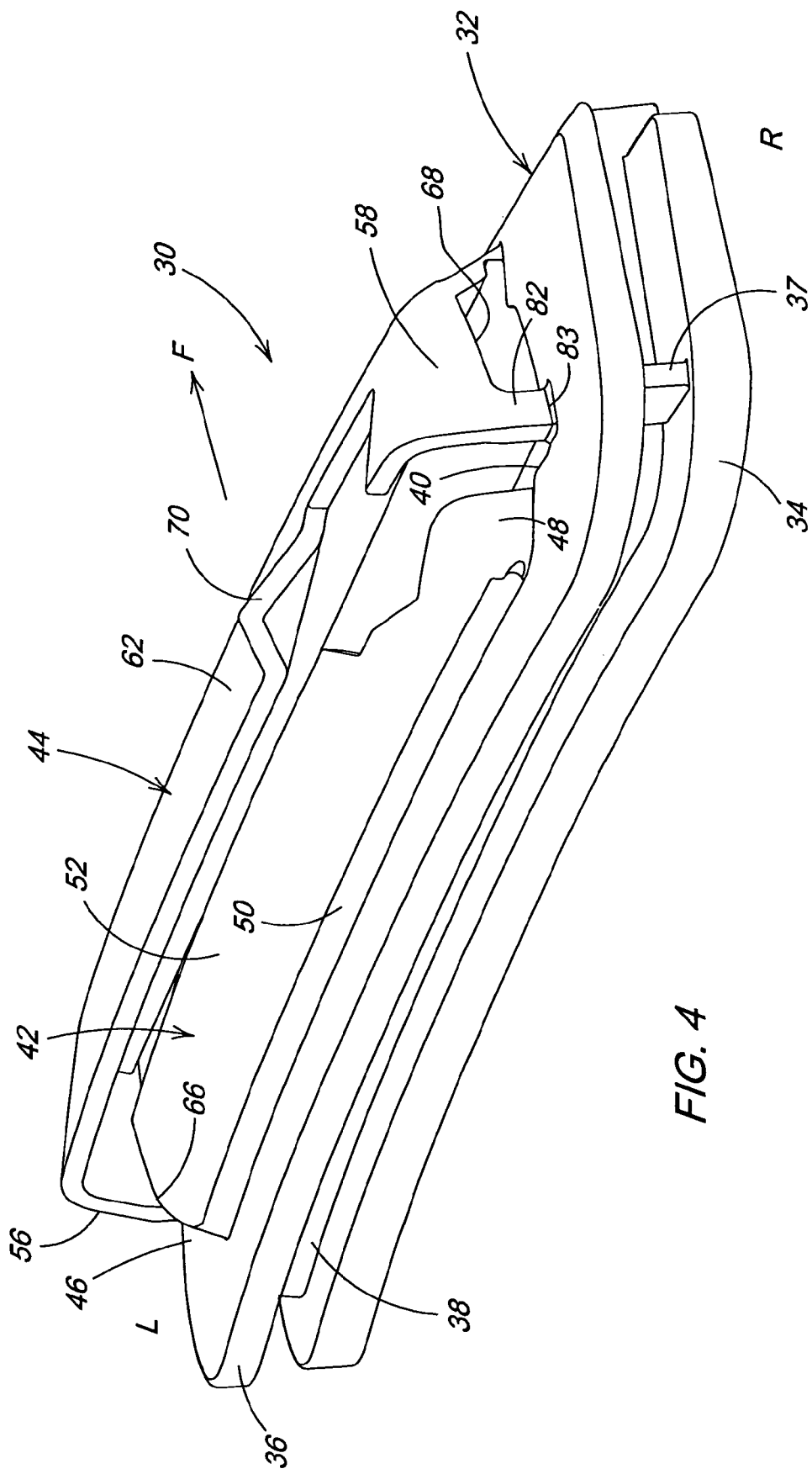
FIG. 4 is rear perspective view of the cover.
Figure 5:
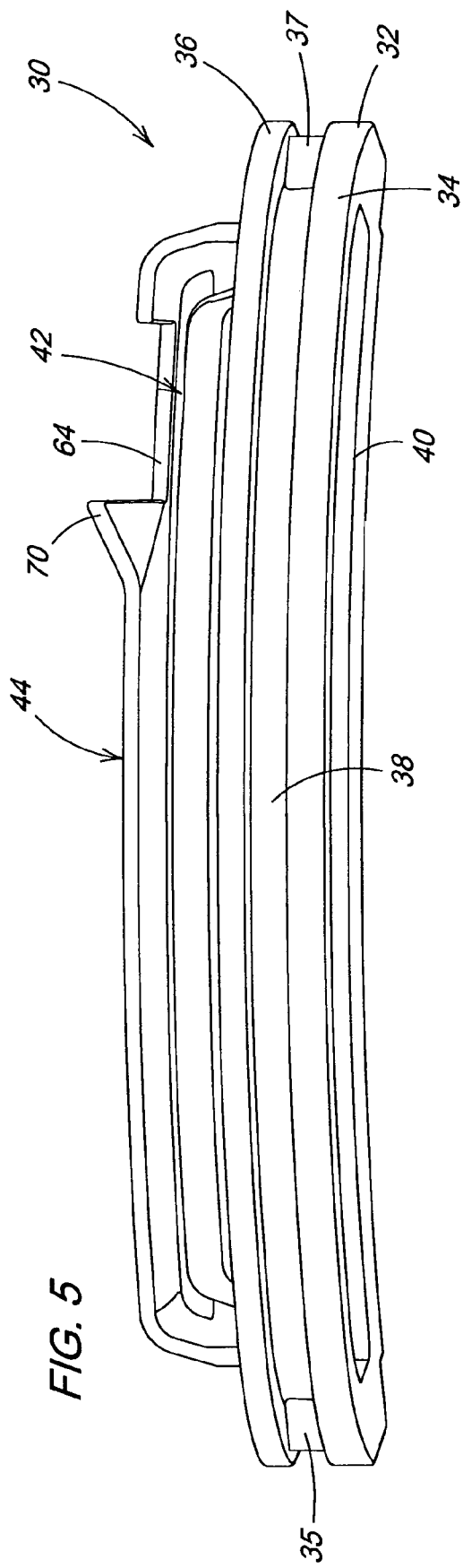
FIG. 5 is rear end perspective view of the cover.

Front flap 44 has left and right side walls 56, 58 and front wall 60 which extend generally upwardly from the base 32 and which curve and merge smoothly into a lip 62 which projects up and towards the rear. A generally rectangular notch 64 is cut out near the right end of lip 62. Recess 54 and notch 64 receive and seal closely around the wiper arm 20 when the wiper 18 is in its park position. Windows 66 and 68 are formed at the bottom of end walls 56 and 58 and facilitate the molding process by which cover 30 is formed. Lip 62 forms a corner member 70 on one side of notch 62. Corner 70 is tilted or bent upwardly with respect to the other portion of lip 62. The front side of base 32 rests on an upper surface of hood 12. As best seen in FIGS. 2-4, the front flap 44 is larger then rear flap 42, front flap 44 partially surrounds rear flap 42, and lip 62 is above and overlays a part of lip 52.

Figure 6:
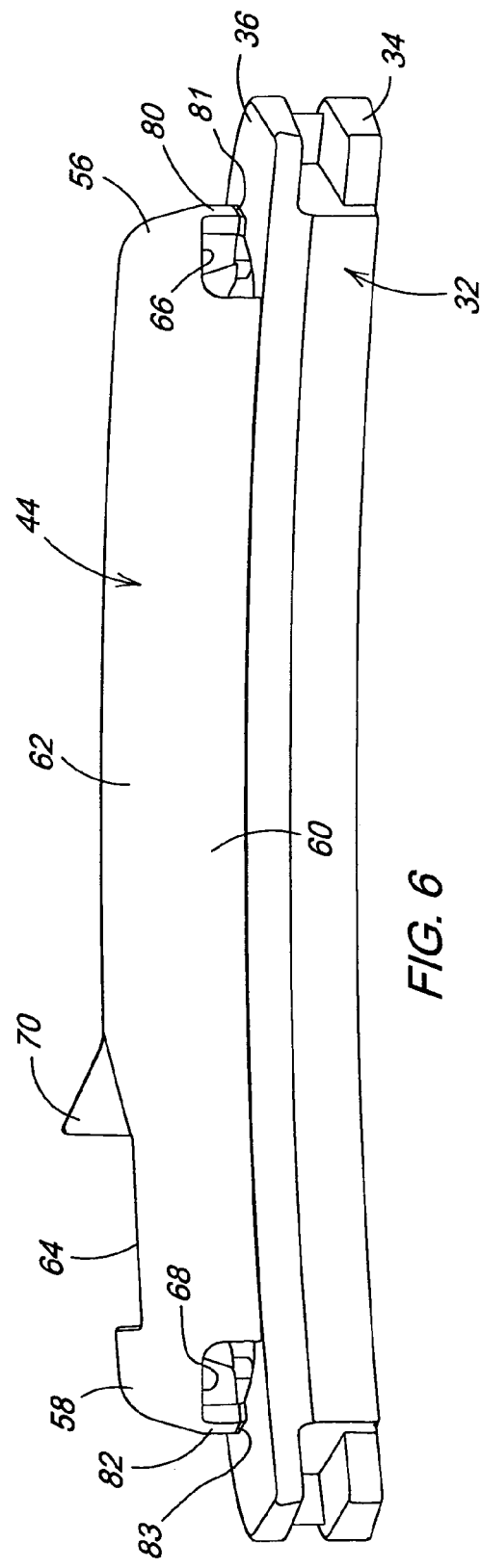
FIG. 6 is front end perspective view of the cover.

The front flap 44 includes left and right support posts or stop blocks 80 and 82 at each end thereof. As best seen in FIG. 6, the blocks 80, 82 are separated from the base 32 by slits 81, 83, respectively, so that the support blocks 80, 82 can separate from the base 32 and allow flap 44 to move so that it does not interfere with the full range of motion of the wiper arm 20. The stop blocks 80, 82 support and hold the front flap 44 in the correct position when the wiper arm 20 is in the park position.

Thus, wiper boot or cover 30 has two overlapping flexible hinged flaps 42, 44 which open and close as the wiper arm 20 passes through them. This cover 30 substantially closes the hole required in the cowl/hood surface, both when the wiper is off and the wiper arm is in its park position, as well as during the wiper operation. The wiper arm 20 passes through a slot between the flaps 42 and 44. Each flap 42 and 44 essentially forms a living hinge with the base 32. The overlap between flaps 42 and 44 essentially closes the opening 22 when viewed from the top, as in FIG. 2, when the wiper arm 20 is in the park position. As the wiper 20 sweeps back and forth, the flaps 42 and 44 flex apart and open to allow the wiper arm 20 to pass through the slot between the flaps. The flaps 42 and 44 open and close with the motion of the wiper arm 20 and leave a minimal opening on either side of the wiper arm 20 through the full range of motion.

When wiper arm 20 is in the park position, most of the arm 20 is received by notch 64, while the corner 72 of recess 54 receives a front washer hose (not shown) which is carried by wiper arm 20, and the corner member 70 of the front flap 44 engages and lays on an uppermost surface of the wiper arm 20. Preferably, the recess 54 and notch 64 provide a minimal clearance with respect to the arm 20 so that the cover 30 is not deformed when the wiper 18 is in the park position. The angled orientation of edge surfaces 74 and 76 helps the rear flap 42 to flex or hinge smoothly with respect to base 32 as the wiper arm 20 passes through the slot between flaps 42 and 44. As the wiper arm 20 pivots from the park position toward the centerline of the cab the arm 20 lifts the corner member 70 and pivots the front flap 44 with respect to the base 32 and opens the slot for the wiper arm 20 to pass through.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A cover mounted in an opening in a vehicle housing and receiving a wiper arm which pivots within the opening, the wiper arm returning to a park position when it is not pivoting, the cover comprising:
   a hollow body mounted in the opening;
   a rear flap projecting upwardly and forwardly from the body; and
   a front flap projecting upwardly and rearwardly from the body, one of the flaps extending above and overlapping a portion of the other flap, the flaps substantially covering the opening and slidably engaging the wiper arm as it pivots within the opening, and one of the flaps having a notch formed therein which receives the wiper arm when the wiper arm is in the park position.

2. The cover of claim 1, wherein:
   the body comprises an upper lip and a lower lip forming a groove therebetween which receives an edge of the housing.

3. The cover of claim 1, wherein:
   the flaps form a pair of notches which receive the wiper arm when the wiper arm is in the park position.

4. The cover of claim 1, wherein:
   the front flap has a rear edge which is above and overlaps a front edge of the rear flap.

5. The cover of claim 1, wherein:
   the front flap has a notch formed therein which receive the wiper arm when the wiper arm is in the park position.

6. The cover of claim 5, wherein:
   the front flap has an upwardly tilted corner member adjacent to the notch.

7. The cover of claim 1, wherein:
   one of the flaps includes a support post which engages the body and supports the flap when the wiper arm is in the park position, the post separating and moving away from the body when the wiper arm is pivoting.

8. The cover of claim 1, wherein:
   the front flap includes left and right support posts which engages the body and supports the flap when the wiper arm is in the park position, the posts separating and moving away from the body when the wiper arm is pivoting.

9. A cover mounted in an opening in a vehicle housing and receiving a wiper arm which pivots within the opening, the wiper arm returning to a park position when it is not pivoting, the cover comprising:
   a hollow body mounted in the opening;
   a rear flap projecting upwardly and forwardly from the body; and
   a front flap projecting upwardly and rearwardly from the body, a portion of the front flap extending above and overlapping a portion of the rear flap, the flaps substantially covering the opening and slidably engaging the wiper arm as it pivots within the opening, and one of the flaps having a notch formed therein which receives the wiper arm when the wiper arm is in the park position.

10. The cover of claim 9, wherein:
    the body comprises an upper lip and a lower lip forming a groove therebetween which receives an edge of the housing.

11. The cover of claim 9, wherein:
    the flaps form a pair of notches which receive the wiper arm when the wiper arm is in the park position.

12. The cover of claim 9, wherein:
    the front flap has a rear edge which is above and overlaps a front edge of the rear flap.

13. The cover of claim 9, wherein:
    the front flap has a notch formed therein which receive the wiper arm when the wiper arm is in the park position.

14. The cover of claim 13, wherein:
    the front flap has an upwardly tilted corner member adjacent to the notch.

15. The cover of claim 9, wherein:
    one of the flaps includes a support post which engages the body and supports the flap when the wiper arm is in the park position, the post separating and moving away from the body when the wiper arm is pivoting.

16. The cover of claim 9, wherein:
    the front flap includes left and right support posts which engages the body and supports the flap when the wiper arm is in the park position, the posts separating and moving away from the body when the wiper arm is pivoting.

* * * * *